United States Patent
Araki

(10) Patent No.: US 10,723,924 B2
(45) Date of Patent: *Jul. 28, 2020

(54) ADHESIVE COMPOSITION AND PRODUCTION METHOD THEREFOR

(71) Applicant: The Yokohama Rubber Co., LTD., Minato-ku, Tokyo (JP)

(72) Inventor: Kiminori Araki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 262 days.

This patent is subject to a terminal disclaimer.

(21) Appl. No.: 15/745,705

(22) PCT Filed: Jul. 15, 2016

(86) PCT No.: PCT/JP2016/071021
§ 371 (c)(1),
(2) Date: Jan. 17, 2018

(87) PCT Pub. No.: WO2017/014192
PCT Pub. Date: Jan. 26, 2017

(65) Prior Publication Data
US 2018/0208815 A1      Jul. 26, 2018

(30) Foreign Application Priority Data
Jul. 17, 2015   (JP) ................. 2015-143084

(51) Int. Cl.
| | | |
|---|---|---|
| C09J 175/12 | (2006.01) | |
| C09J 175/04 | (2006.01) | |
| C08G 18/16 | (2006.01) | |
| C08G 18/48 | (2006.01) | |
| C08G 18/76 | (2006.01) | |
| C08G 18/24 | (2006.01) | |
| C08G 18/20 | (2006.01) | |
| C08G 18/10 | (2006.01) | |
| C08G 18/38 | (2006.01) | |
| C08G 18/73 | (2006.01) | |
| C08K 3/013 | (2018.01) | |
| C08K 5/00 | (2006.01) | |

(52) U.S. Cl.
CPC .......... *C09J 175/12* (2013.01); *C08G 18/10* (2013.01); *C08G 18/165* (2013.01); *C08G 18/2081* (2013.01); *C08G 18/242* (2013.01); *C08G 18/246* (2013.01); *C08G 18/3893* (2013.01); *C08G 18/4812* (2013.01); *C08G 18/4825* (2013.01); *C08G 18/4829* (2013.01); *C08G 18/73* (2013.01); *C08G 18/7671* (2013.01); *C09J 175/04* (2013.01); *C08K 3/013* (2018.01); *C08K 5/0016* (2013.01)

(58) Field of Classification Search
CPC .... C09J 175/12; C08G 18/10; C08G 18/3893; C08G 18/242; C08G 18/73; C08K 3/013
USPC ........................................................ 524/869
See application file for complete search history.

(56) References Cited

U.S. PATENT DOCUMENTS

| | | | | |
|---|---|---|---|---|
| 5,372,875 | A * | 12/1994 | Markusch ................ | C08K 7/14 428/423.1 |
| 2006/0111516 | A1 | 5/2006 | Schumacher | |
| 2014/0290855 | A1* | 10/2014 | Ristoski ................ | C08G 18/10 156/331.7 |
| 2015/0315435 | A1* | 11/2015 | Mori ..................... | C09J 175/04 524/773 |
| 2017/0058076 | A1 | 3/2017 | Araki | |

FOREIGN PATENT DOCUMENTS

| | | |
|---|---|---|
| JP | 2001-059008 | 3/2001 |
| JP | 2005-530016 | 10/2005 |
| JP | 2013-095759 | 5/2013 |
| JP | 2014-122256 | 7/2014 |
| JP | 2015-212330 | 11/2015 |
| WO | WO 2004/000906 | 12/2003 |
| WO | WO 2014/097905 | 6/2014 |
| WO | WO 2015/166610 | 11/2015 |

OTHER PUBLICATIONS

International Search Report for International Application No. PCT/JP2016/071021 dated Sep. 13, 2016, 4 pages, Japan.

* cited by examiner

*Primary Examiner* — Hui H Chin
(74) *Attorney, Agent, or Firm* — Thorpe North & Western

(57) ABSTRACT

The present technology provides a one-part moisture curable adhesive composition and a production method thereof. The adhesive composition contains: a preliminary composition containing a urethane prepolymer and a reaction product of an aliphatic isocyanate A and an aminosilane compound B or a monoterpene alcohol; and a dimethyl tin catalyst represented by Formula (1) below. In Formula (1), $X_1$ and $X_2$ each independently represent a divalent heteroatom and $R_1$ and $R_2$ each independently represent a hydrocarbon group that may have a heteroatom.

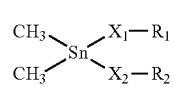

(1)

10 Claims, No Drawings

ADHESIVE COMPOSITION AND PRODUCTION METHOD THEREFOR

TECHNICAL FIELD

The present technology relates to an adhesive composition and a production method thereof.

BACKGROUND ART

Conventionally, one-part urethane resin compositions that utilize moisture curability have been widely used as adhesive agents or the like.

For example, Japanese Unexamined Patent Publication No. 2013-095759 describes "a polyurethane adhesive composition for resin glass, the polyurethane adhesive composition containing:

a preliminary composition containing a urethane prepolymer obtained by reaction of a mixture of a polyether triol having a number average molecular weight of 1000 to 7000 and a polyether diol with 4,4'-diphenylmethane diisocyanate under a condition that the equivalent weight ratio of the isocyanate group to the hydroxy group is from 1.1 to 2.5;

an adhesion promoter A obtained via addition of 3-(N-phenyl)aminopropyltrimethoxysilane and the biuret of hexamethylene diisocyanate under a condition that the equivalent weight ratio of the isocyanate group to the amino group is from 1.5/1.0 to 9.0/1.0; and an organotin compound;

a content of the adhesion promoter A being from 2 parts by mass to 10 parts by mass per 100 parts by mass of the urethane prepolymer; and a content of the organotin compound being from 0.001 parts by mass to 0.5 parts by mass per 100 parts by mass of the urethane prepolymer". Furthermore, Japanese Unexamined Patent Publication No. 2013-095759 describes dioctyltin dilaurate, dibutyltin laurate, and the like as the organotin compound.

When the inventor of the present technology produced a composition containing a compound in which an alkyl group bonded to a tin atom has two or more carbons, such as dioctyltin dilaurate and dibutyltin laurate, using Japanese Unexamined Patent Publication No. 2013-095759 as a reference and evaluated the composition by applying the composition onto a coated plate with poor adhesion containing no primer, it was found that such a composition may exhibit low adhesion to the coated plate with poor adhesion.

SUMMARY

The present technology provides an adhesive composition having excellent adhesion to coated plates with poor adhesion.

The inventor of the present technology has found that excellent adhesion to a coated plate with poor adhesion is achieved by allowing a urethane prepolymer, a preliminary composition obtained by mixing a reaction product obtained by reacting an aliphatic isocyanate A and an aminosilane compound B or a monoterpene alcohol, and a predetermined catalyst to be contained.

Specifically, the present technology can be described by the following features.

1. A one-part moisture curable adhesive composition including:

a preliminary composition containing a urethane prepolymer and a reaction product of an aliphatic isocyanate A and an aminosilane compound B or a monoterpene alcohol (or a preliminary composition obtained by mixing a urethane prepolymer and a reaction product obtained by reacting an aliphatic isocyanate A and an aminosilane compound B or a monoterpene alcohol); and a dimethyl tin catalyst represented by Formula (1):

$$CH_3 \underset{CH_3}{\overset{}{\diagdown}} Sn \underset{X_2-R_2}{\overset{X_1-R_1}{\diagup}} \quad (1)$$

where $X_1$ and $X_2$ each independently represent a divalent heteroatom and $R_1$ and $R_2$ each independently represent a hydrocarbon group that may have a heteroatom.

2. The adhesive composition according to 1 above, where the divalent heteroatom is at least one type selected from the group consisting of an oxygen atom and a sulfur atom.

3. The adhesive composition according to 1 or 2 above, where the $X_1$ moiety and the $X_2$ moiety are each a sulfur atom, and the $R_1$ moiety and the $R_2$ moiety are each an unsubstituted or ester bond-containing alkyl group.

4. The adhesive composition according to 1 or 2 above, where the $X_1$ moiety and the $X_2$ moiety are each an oxygen atom, and the $R_1$ moiety and the $R_2$ moiety are each a carbonyl group-containing alkyl group.

5. The adhesive composition according to any one of 1 to 4 above, where a content of the dimethyl tin catalyst is from 0.001 to 0.3 parts by mass per 100 parts by mass of the urethane prepolymer.

6. The adhesive composition according to any one of 1 to 5 above, where the aliphatic isocyanate A is at least one type of hexamethylene diisocyanate modified product selected from the group consisting of reaction products of hexamethylene diisocyanate and a polyol having tri- or higher functionality, allophanates of hexamethylene diisocyanate, isocyanurates of hexamethylene diisocyanate, and biurets of hexamethylene diisocyanate.

7. The adhesive composition according to any one of 1 to 6 above, where the aminosilane compound B has an imino group, and the imino group bonds to at least one aromatic hydrocarbon group.

8. The adhesive composition according to any one of 1 to 7 above, further including a tertiary amine.

9. The adhesive composition according to any one of 1 to 8 above, where the preliminary composition further contains a filler.

10. The adhesive composition according to any one of 1 to 9 above, where the preliminary composition further contains a plasticizer.

11. A method of producing an adhesive composition, the method including:

a mixing step 1 of obtaining a preliminary composition by mixing a urethane prepolymer and a reaction product; and a mixing step 2 of producing the adhesive composition described in any one of 1 to 10 (or 7) by mixing the preliminary composition and the dimethyl tin catalyst represented by Formula (1).

12. The method of producing an adhesive composition according to 11 above, where in the mixing step 1, at least one type selected from the group consisting of fillers and plasticizers is further used.

13. The method of producing an adhesive composition according to 11 or 12 above, where in the mixing step 2, a tertiary amine is further used.

The adhesive composition according to an embodiment of the present technology exhibits excellent adhesion to a coated plate with poor adhesion.

According to the production method of the present technology, an adhesive composition having excellent adhesion to a coated plate with poor adhesion can be produced.

DETAILED DESCRIPTION

Embodiments of the present technology are described in detail below.

Note that, in the present specification, numerical ranges indicated using "(from) . . . to . . . " include the former number as the lower limit value and the later number as the upper limit value.

Furthermore, in the present specification, when two or more types of substances are contained in a component, a content of the component indicates the total content of the two or more types of the substances.

In the present specification, exhibiting even better adhesion to a coated plate with poor adhesion is referred to as "exhibiting superior effect of the present technology" or "exhibiting superior adhesion".

The adhesive composition according to an embodiment of the present technology is
a one-part moisture curable adhesive composition including:
a preliminary composition containing a urethane prepolymer and a reaction product of an aliphatic isocyanate A and an aminosilane compound B or a monoterpene alcohol; and
a dimethyl tin catalyst represented by Formula (1) below.

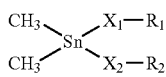

(1)

In Formula (1), $X_1$ and $X_2$ each independently represent a divalent heteroatom and $R_1$ and $R_2$ each independently represent a hydrocarbon group that may have a heteroatom.

The adhesive composition according to an embodiment of the present technology is thought to achieve desired effects as a result of having such a configuration. Although the reason for this is unknown, the reason is presumed to be as follows.

The present inventor presumes that the predetermined dimethyl tin catalyst has higher activity than that of a dioctyl tin catalyst, and by allowing the adhesive composition according to an embodiment of the present technology to contain the predetermined dimethyl tin catalyst, the adhesive composition tends to produce a bond with an active hydrogen except water (e.g. coated plate) compared to the tendency to cause curing of the adhesive agent itself due to the reaction with water. It is conceived that, because of this, the adhesive composition according to an embodiment of the present technology achieves excellent adhesion to a coated plate with poor adhesion.

Adhesive Composition

Each of the components contained in the adhesive composition according to an embodiment of the present technology will be described in detail below.

Preliminary Composition

The preliminary composition contained in the adhesive composition according to an embodiment of the present technology contains a urethane prepolymer and a reaction product of an aliphatic isocyanate A and an aminosilane compound B or a monoterpene alcohol.

An example of a preferable aspect is one in which the preliminary composition is produced by mixing a urethane prepolymer and a reaction product obtained by reacting an aliphatic isocyanate A and an aminosilane compound B or a monoterpene alcohol.

Urethane Prepolymer

The urethane prepolymer used in the adhesive composition according to an embodiment of the present technology is not particularly limited as long as the urethane prepolymer is a urethane prepolymer having an isocyanate group at a terminal. For example, a substance obtained by reacting polyisocyanate with a compound having two or more active hydrogen-containing groups per molecule (active hydrogen compounds) in a manner that the amount of the isocyanate groups contained in the polyisocyanate is in excess relative to the amount of the active hydrogen-containing groups contained in the active hydrogen compound can be used. The urethane prepolymer may contain from 0.5 to 5 mass % of an isocyanate group at molecular terminals.

The polyisocyanate used during the production of the urethane prepolymer is not particularly limited as long as the polyisocyanate has two or more isocyanate groups per molecule.

Examples of the polyisocyanate include aromatic polyisocyanates, such as tolylene diisocyanate (TDI), diphenylmethane diisocyanate (MDI; e.g. 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate;

aliphatic and/or alicyclic polyisocyanates, such as hexamethylene diisocyanate (HDI), trimethylhexamethylene diisocyanate (TMHDI), lysine diisocyanate, and norbornane diisocyanate (NBDI), transcyclohexane-1,4-diisocyanate, isophorone diisocyanate (IPDI), bis(isocyanate methyl)cyclohexane ($H_6XDI$), and dicyclohexylmethane diisocyanate (HINDI);

carbodiimide-modified polyisocyanates thereof; and isocyanurate-modified polyanates thereof.

A single polyisocyanate can be used or a combination of two or more polyisocyanates can be used.

Among these, an aromatic polyisocyanate is preferable, and MDI is more preferable, from the perspective of excellent curability and excellent physical properties of the cured product.

The compound having two or more active hydrogen-containing groups per molecule (active hydrogen compound) that is used during the production of the urethane prepolymer is not particularly limited. Examples of the active hydrogen-containing group include a hydroxy (OH) group, an amino group, and an imino group.

Preferred examples of the active hydrogen compound include polyol compounds having two or more hydroxy (OH) groups per molecule. Among these, a polyol compound is preferable.

The polyol compound is not particularly limited as long as the polyol compound is a compound having two or more hydroxy groups. Examples of the polyol compound include polyether polyols; polyester polyols; polymer polyols having a carbon-carbon bond in a main backbone chain, such as acrylic polyols, polybutadiene diols, and hydrogenated polybutadiene polyols; low molecular weight polyhydric alcohols; and mixed polyols thereof. Among these, a polyether polyol is exemplified as an example of preferable aspects.

Examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, and sorbitol polyol.

The polyether polyol is preferably polypropylene glycol or polyoxypropylene triol from the perspective of excellent miscibility with polyisocyanate.

The weight average molecular weight of the polyether polyol is preferably from 500 to 20000, from the perspective of the viscosity of the urethane prepolymer, obtained by a reaction with isocyanate, exhibiting an appropriate flowability at ambient temperature. In an embodiment of the present technology, the weight average molecular weight is a value obtained by gel permeation chromatography (GPC) analysis (solvent: tetrahydrofuran (THF) is used) based on calibration with polystyrene.

The active hydrogen compound may be used alone, or a combination of two or more types of the active hydrogen compounds may be used.

The urethane prepolymer is preferably a urethane prepolymer formed by reacting a polyether polyol and an aromatic polyisocyanate, from the perspective of achieving even better adhesion and excellent curability. The urethane prepolymer is more preferably a urethane prepolymer obtained by reacting polypropylene polyol and diphenylmethane diisocyanate.

The urethane prepolymer can be used alone or in combination of two or more types.

The method of producing the urethane prepolymer is not particularly limited. For example, the urethane prepolymer can be produced by using polyisocyanate in a manner that from 1.5 to 2.5 mol of an isocyanate group is reacted per 1 mol of the active hydrogen-containing group (e.g. hydroxy group) contained in the active hydrogen compound, and mixing these to perform a reaction.

The urethane prepolymer can be used alone or in combination of two or more types.

Reaction Product

The reaction product used in the adhesive composition according to an embodiment of the present technology is a reaction product of an aliphatic isocyanate A and an aminosilane compound B or a monoterpene alcohol.

For example, —NH—CO—NH— or —NH—CO—N can be formed by the reaction between the aliphatic isocyanate A and the aminosilane compound B.

For example, a urethane bond can be formed by the reaction between the aliphatic isocyanate A and the monoterpene alcohol.

The reaction product may contain at least one type selected from the group consisting of a reaction product 1 of the aliphatic isocyanate A and the aminosilane compound B and a reaction product 2 of the aliphatic isocyanate A and the monoterpene alcohol. When the aliphatic isocyanate A is an aliphatic polyisocyanate (the aliphatic polyisocyanate includes modified products thereof), the reaction product may contain at least one type selected from the group consisting of a reaction product 3 of the aliphatic polyisocyanate and the aminosilane compound B, a reaction product 4 of the aliphatic polyisocyanate and the monoterpene alcohol, and a reaction product 5 of the aliphatic polyisocyanate and the aminosilane compound B and the monoterpene alcohol.

In an embodiment of the present technology, the reaction product can function as an adhesion promoter.

Aliphatic Isocyanate A

In the adhesive composition according to an embodiment of the present technology, the aliphatic isocyanate A used in the production of the reaction product is not particularly limited as long as the aliphatic isocyanate A is an aliphatic hydrocarbon compound having at least one isocyanate group per molecule.

The aliphatic hydrocarbon group contained in the aliphatic isocyanate A is not particularly limited. The aliphatic hydrocarbon group may be a straight-chain, branched-chain, or cyclic aliphatic hydrocarbon group, and a straight-chain aliphatic hydrocarbon group is preferable. The aliphatic hydrocarbon group may be a saturated or unsaturated aliphatic hydrocarbon group, and a saturated aliphatic hydrocarbon group is preferable.

The number of the isocyanate group contained per molecule of the aliphatic isocyanate A is preferably 2 or more, and more preferably 2 or 3, from the perspective of even better adhesion.

Examples of the aliphatic isocyanate A include aliphatic polyisocyanates (excluding modified products), such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatemethyl)cyclohexane ($H_6XDI$), and dicyclohexylmethane diisocyanate ($H_{12}MDI$) (hereinafter, the aliphatic polyisocyanate described above may be referred to as "aliphatic polyisocyanate b"); and modified products of aliphatic polyisocyanates.

The aliphatic isocyanate A is preferably a modified product of aliphatic polyisocyanate from the perspective of even better adhesion and a wider range of adhesion depending on the environment at the time of curing (i.e. excellent adhesion regardless of the environment during the curing (e.g. temperature environment)).

The modified product of the aliphatic polyisocyanate is preferably at least one type of aliphatic isocyanate-modified product a selected from the group consisting of reaction products of a polyol having tri- or higher functionality and an aliphatic polyisocyanate, allophanates of aliphatic polyisocyanate, isocyanurates of aliphatic polyisocyanate, and biurets of aliphatic polyisocyanate, from the perspective of excellent balance between adhesion and physical properties of the adhesive agent after the curing.

The aliphatic polyisocyanate used in the aliphatic isocyanate-modified product a is not particularly limited as long as the aliphatic polyisocyanate is an aliphatic hydrocarbon compound having at least two isocyanate groups per molecule. Examples include the same as those exemplified for the aliphatic polyisocyanate b. Among these, a straight-chain aliphatic polyisocyanate is preferable, and HDI is more preferable, from the perspective of achieving even better adhesion and being less likely to cause foaming due to the added amount.

Examples of the reaction product of a polyol having tri- or higher functionality and an aliphatic polyisocyanate include trimethylolpropane (TMP), and reaction products of trifunctional polyol, such as glycerin, and an aliphatic polyisocyanate b (e.g. HDI). Specific examples include reaction products of TMP and HDI (e.g. compound represented by Formula (5) below) and reaction products of glycerin and HDI (e.g. compound represented by Formula (6) below).

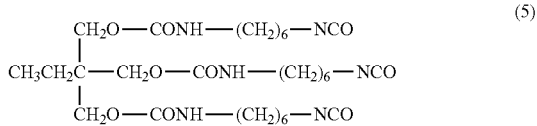

(5)

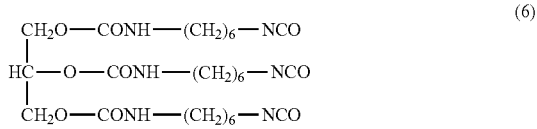

(6)

Examples of the allophanate of aliphatic polyisocyanate include an allophanate of HDI.

Examples of the biuret of aliphatic polyisocyanate include a biuret of HDI. Specifically, preferred examples include a compound represented by Formula (7) below.

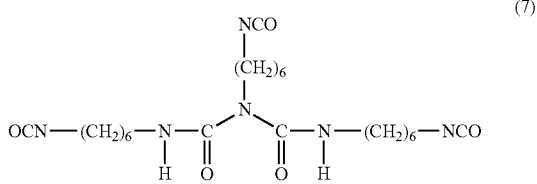

(7)

Examples of the isocyanurate of aliphatic polyisocyanate include an isocyanurate of HDI. Specific examples include a compound represented by Formula (8) below.

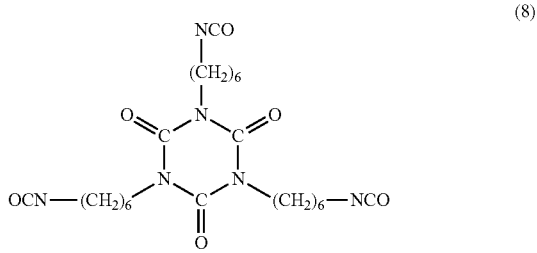

(8)

From the perspective of achieving excellent heat-resistant adhesion and stability in pipes, the aliphatic isocyanate A is preferably a biuret of HDI or an isocyanurate of HDI, and more preferably a biuret of HDI.

The method of producing the aliphatic isocyanate A is not particularly limited. Examples thereof include conventionally known methods. The aliphatic isocyanate A may be used alone, or a combination of two or more types of the aliphatic isocyanates A may be used.

The content of the aliphatic isocyanate A is preferably from 0.8 to 15 parts by mass, more preferably from 0.8 to 10 parts by mass, and even more preferably from 3.0 to 8.0 parts by mass, per 100 parts by weight of the urethane prepolymer from the perspective of even better adhesion and excellent physical properties of the cured product.

Aminosilane Compound B

The aminosilane compound B that can be used in the production of the reaction product in the adhesive composition according to an embodiment of the present technology is not particularly limited as long as the aminosilane compound B is a compound having at least one type selected from the group consisting of amino groups (—NH$_2$) and imino groups (—NH—), and a hydrolyzable silyl group. The amino group or the imino group and the hydrolyzable silyl group can be bonded to each other via organic group(s).

When the aminosilane compound B contains an imino group, an example of a preferable aspect is one in which the group bonded to the imino group is an aromatic hydrocarbon group.

The aromatic hydrocarbon group is not particularly limited as long as the aromatic hydrocarbon group is a hydrocarbon group having at least an aromatic ring. Examples of the aromatic ring include a benzene ring and a naphthalene ring.

The aromatic ring may have a substituent. Examples of the substituent include alkyl groups.

Examples of the hydrolyzable silyl group include substances in which at least one hydrolyzable group is bonded to one silicon atom. When one or two hydrolyzable groups are bonded to one silicon atom, other groups that can bond to the same silicon atom are not particularly limited. Examples thereof include hydrocarbon groups. The hydrocarbon group is not particularly limited but is preferably an alkyl group.

Examples of the hydrolyzable silyl group include alkoxysilyl groups. Specific examples thereof include methoxysilyl groups (monomethoxysilyl group, dimethoxysilyl group, and trimethoxysilyl group) and ethoxysilyl groups (monoethoxysilyl group, diethoxysilyl group, and triethoxysilyl group).

The organic group is not particularly limited. Examples thereof include hydrocarbon groups that may have a heteroatom such as an oxygen atom, nitrogen atom, and sulfur atom. Examples of the hydrocarbon group include aliphatic hydrocarbon groups (which may be in a straight-chain, branched-chain, or cyclic form and may have an unsaturated bond), aromatic hydrocarbon groups, and combinations thereof. At least one of the carbon atom or the hydrogen atom contained in the hydrocarbon group may be substituted with a substituent. Among these, an example of a preferable aspect is one in which the organic group is an aliphatic hydrocarbon group.

From the perspective of even better adhesion, storage stability of the adhesive agent, and excellent flow resistance, the aminosilane compound B is preferably a compound having an alkoxysilyl group and an imino group per molecule, more preferably a compound having an alkoxysilyl group and an imino group bonded to an aromatic hydrocarbon group per molecule, and even more preferably a compound which has an alkoxysilyl group and an imino group bonded to an aromatic hydrocarbon group per molecule and in which the alkoxysilyl group and the imino group are bonded to each other via an aliphatic hydrocarbon group.

Examples of the aminosilane compound B include a compound represented by Formula (I) below.

$$R^1{}_n\text{—NH}_{2-n}\text{—}R^2\text{—Si—}R^3{}_3 \qquad (I)$$

In Formula (I), $R^1$ represents an aromatic hydrocarbon group, n is 0 or 1, $R^2$ represents a divalent aliphatic hydrocarbon group, at least one of the three $R^3$ moieties is an alkoxy group and the three $R^3$ moieties may be the same or different. When one or two of the three $R^3$ moieties are alkoxy group(s), the other $R^3$ is preferably alkyl group(s).

Examples of the aromatic hydrocarbon group include a phenyl group.

Examples of the divalent aliphatic hydrocarbon group include a methylene group, an ethylene group, a propylene group, and a trimethylene group.

Examples of the alkoxy group include a methoxy group and an ethoxy group.

Examples of the alkyl group include a methyl group and an ethyl group.

Specific examples of the aminosilane compound B include N-phenyl-3-aminopropyltrimethoxysilane and N-phenyl-3-aminopropyltriethoxysilane.

The method of producing the aminosilane compound B is not particularly limited. Examples thereof include conventionally known methods. The aminosilane compound B may be used alone, or a combination of two or more types of the aminosilane compounds B may be used.

The content of the aminosilane compound B is preferably from 0.1 to 10 parts by mass, more preferably from 0.3 to 5 parts by mass, and even more preferably from 0.8 to 3 parts by mass, per 100 parts by weight of the urethane prepolymer from the perspective of even better adhesion and excellent storage stability of the uncured product.

Monoterpene Alcohol

In the adhesive composition according to an embodiment of the present technology, the monoterpene alcohol that can be used in the production of the reaction product is a compound formed from two isoprene units and having a hydroxy group.

The monoterpene alcohol may have one or two double bond(s) per molecule. In an embodiment of the present technology, the monoterpene alcohol includes hydrogenated products of monoterpene alcohol.

Examples of the monoterpene alcohol include a compound represented by Formula (II) below. Note that the compound represented by Formula (II) may be a hydrogenated product (hydrogenated compound).

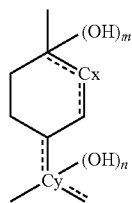

(II)

In Formula (II), the portion indicated by two lines including a solid line and a dotted line represents a single bond or a double bond. The portion indicated by a dotted single line represents no bond or a single bond. m and n are each independently 0 or 1, and m+n is 1. Note that Cx and Cy each represent a carbon atom. When the compound represented by Formula (II) has a double bond, Cx and Cy each can form one double bond.

When no bond exists at the portion indicated by a dotted single line, the monoterpene alcohol may be open-chain and may have two double bonds.

When the portion indicated by a dotted single line represents a single bond, the monoterpene alcohol may have a six-membered ring and may have one double bond.

Examples of the monoterpene alcohol include a compound represented by Formulas (II-1) to (II-4) below and hydrogenated products thereof (hydrogenated compounds).

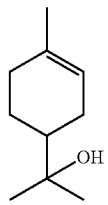

(II-1)

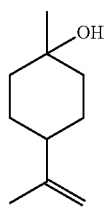

(II-2)

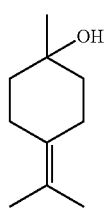

(II-3)

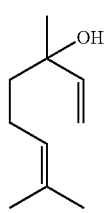

(II-4)

Among these, use of a terpineol, such as a compound represented by Formula (II-1) above (α-terpineol), a compound represented by Formula (II-2) above (β-terpineol), or a compound represented by Formula (II-3) above (γ-terpineol), is preferable.

One type of the monoterpene alcohol may be used alone, or a combination of two or more types of the monoterpene alcohols may be used.

From the perspective of achieving even better adhesion, the content of the monoterpene alcohol is preferably an amount by which the molar ratio of the isocyanate group contained in the aliphatic isocyanate A to the hydroxy group contained in the monoterpene alcohol (NCO group/OH group) is from 1.2 to 3.5.

Method of Preparing Reaction Product

The reaction product can be prepared by heating and stirring the aliphatic isocyanate A and the aminosilane compound B or the monoterpene alcohol at, for example, 50 to 100° C.

Note that urethanization catalysts, such as organotin compounds, organic bismuth, and amine, can be also used as necessary.

The reaction product may contain an unreacted aliphatic isocyanate A, an aminosilane compound B, or a monoterpene alcohol.

In an embodiment of the present technology, from the perspective of even better adhesion, physical properties of the cured product, and excellent storage stability in the uncured state, the content of the reaction product is preferably from 0.5 to 20 parts by mass, and more preferably from 0.8 to 10 parts by mass, per 100 parts by mass of the preliminary composition.

Filler

In an embodiment of the present technology, the preliminary composition may further contain a filler. In this case, excellent thixotropy of the adhesive agent, excellent deep curability after the application of the adhesive agent, and excellent physical properties after the curing.

The filler is not particularly limited. An example of a preferable aspect is one in which the filler is at least one type selected from the group consisting of carbon blacks and white fillers. The filler may be, for example, a filler which has undergone surface treatment with a surface treating agent, such as fatty acids, resin acids, urethane compounds, and fatty acid esters.

The carbon black is not particularly limited. Examples thereof include conventionally known carbon blacks.

The content of the carbon black is preferably from 10 to 150 parts by mass, and more preferably from 30 to 100 parts by mass, per 100 parts by mass of the urethane prepolymer from the perspective of flow resistance and excellent physical properties of the cured product.

Examples of the white filler include calcium carbonate, such as heavy calcium carbonate, precipitated calcium carbonate (light calcium carbonate), and colloidal calcium carbonate; magnesium carbonate and zinc carbonate; silica, such as fumed silica, calcined silica, precipitated silica, pulverized silica, and molten silica; diatomaceous earth; iron oxide, zinc oxide, titanium oxide, barium oxide, magnesium oxide; pyrophyllite clay, kaolin clay, and calcined clay.

The content of the white filler is preferably from 5 to 80 parts by mass, and more preferably from 10 to 50 parts by mass, per 100 parts by mass of the urethane prepolymer from the perspective of excellent deep curability during the curing.

Plasticizer

In an embodiment of the present technology, the preliminary composition may further contain a plasticizer. In this case, excellent control in viscosity and physical properties of the adhesive composition and excellent coatability can be achieved.

Examples of the plasticizer include diisononyl phthalate (DINP); dioctyl adipate and isodecyl succinate; diethylene glycol dibenzoate and pentaerythritol esters; butyl oleate and methyl acetyl ricinoleate; tricresyl phosphate and trioctyl phosphate; and propylene glycol adipate polyesters and butylene glycol adipate polyesters.

The plasticizer may be used alone, or a combination of two or more types of the plasticizers may be used.

The content of the plasticizer is preferably from 5 to 100 parts by mass, and more preferably from 10 to 50 parts by mass, per 100 parts by mass of the urethane prepolymer, from the perspective of control in viscosity and physical properties and excellent coatability.

Dimethyl Tin Catalyst

The dimethyl tin catalyst contained in the adhesive composition according to an embodiment of the present technology is a compound represented by Formula (1) below.

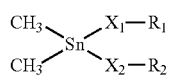

(1)

In Formula (1), $X_1$ and $X_2$ each independently represent a divalent heteroatom and $R_1$ and $R_2$ each independently represent a hydrocarbon group that may have a heteroatom.

Examples of the divalent heteroatom include an oxygen atom and a sulfur atom.

Examples of the heteroatom that may be contained in the hydrocarbon group include an oxygen atom, nitrogen atom, and sulfur atom.

Examples of the hydrocarbon group include aliphatic hydrocarbon groups (which may be in a straight-chain, branched-chain, or cyclic form and may have an unsaturated bond), aromatic hydrocarbon groups, and combinations thereof.

At least one of the carbon atom or the hydrogen atom contained in the hydrocarbon group may be substituted with a substituent. Examples of the substituent include carbonyl groups and ester bonds. Among the carbon atoms contained in the hydrocarbon group, carbon atoms that are located at positions other than the both terminals of the hydrocarbon group may be substituted with a substituent.

Dimethyltin Dicarboxylate

From the perspective of achieving excellent catalytic activity and suppressing increase in viscosity of the composition after storage, in Formula (1), the dimethyl tin catalyst is preferably dimethyltin dicarboxylate, in which $X_1$ and $X_2$ are oxygen atoms, $R_1$ and $R_2$ are alkyl groups each having a carbonyl group, and the oxygen atom and the carbonyl group are bonded to each other to form an ester bond.

Examples of the dimethyltin dicarboxylate include dimethyltin dicarboxylate represented by Formula (2) below.

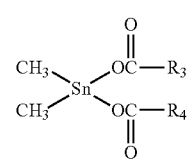

(2)

In Formula (2), $R_3$ and $R_4$ are each independently a hydrocarbon group. The hydrocarbon groups are the same as the hydrocarbon groups represented by $R_1$ and $R_2$.

Specific examples of the dimethyltin dicarboxylate include dimethyltin dilaurate represented by Formula (2-1) below and dimethyltin dioctate represented by Formula (2-2) below.

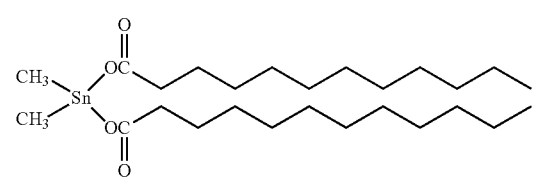

(2-1)

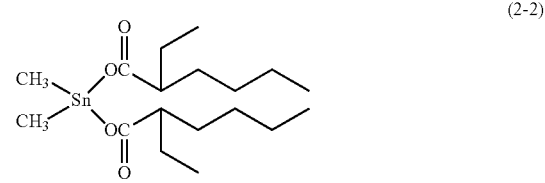

(2-2)

Thio-Based Dimethyl Tin Catalyst

From the perspective of even better adhesion, balance of stability (of the catalyst itself) and catalytic activity, excellent stability in pipes, and capability of suppressing increase in viscosity of the composition after storage, in Formula (1), the dimethyl tin catalyst is preferably a thio-based dimethyl tin catalyst, in which $X_1$ and $X_2$ are sulfur atoms, $R_1$ and $R_2$ are unsubstituted or ester bond-containing alkyl groups. In this case, $R_1$ and $R_2$ may be the same or different.

Note that "$R_1$ and $R_2$ are unsubstituted or ester bond-containing alkyl groups" means that $R_1$ and $R_2$ are unsubstituted alkyl groups or $R_1$ and $R_2$ are ester bond-containing alkyl groups.

Furthermore, in the ester bond-containing alkyl group, at least one carbon atom contained in the alkyl group may be substituted with a substituent. Examples of the substituent include carbonyl groups and ester bonds. Among the carbon atoms contained in the alkyl group, carbon atoms that are located at positions other than the both terminals of the alkyl group may be substituted with a substituent.

Dimethyltin Dimercaptide

In Formula (1), examples of the thio-based dimethyl tin catalyst, in which $X_1$ and $X_2$ are sulfur atoms, $R_1$ and $R_2$ are unsubstituted alkyl groups, include dimethyltin dimercaptide.

Examples of the dimethyltin dimercaptide include dimethyltin dimercaptide represented by Formula (3) below.

(3)

In Formula (3), $R_3$ and $R_4$ are each independently a hydrocarbon group. The hydrocarbon groups are the same as the hydrocarbon groups represented by $R_1$ and $R_2$.

Specific examples of the dimethyltin dimercaptide include dimethyltin didodecyl mercaptide represented by Formula (3-1) below and dimethyltin dioctyl mercaptide.

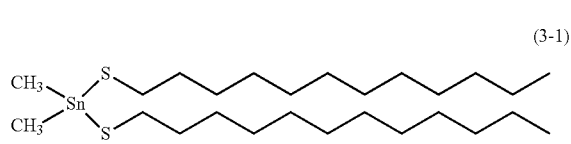 [SMILES: CCCCCCCCCCCC[S][Sn]([CH3])([CH3])[S]CCCCCCCCCCCC]

(3-1)

Dimethyltin Dithioglycolate

In Formula (1), examples of the dimethyl tin catalyst, in which $X_1$ and $X_2$ are sulfur atoms, $R_1$ and $R_2$ are ester bond-containing alkyl groups, include dimethyltin dithioglycolate.

Examples of the dimethyltin dithioglycolate include dimethyltin dithioglycolate represented by Formula (4) below.

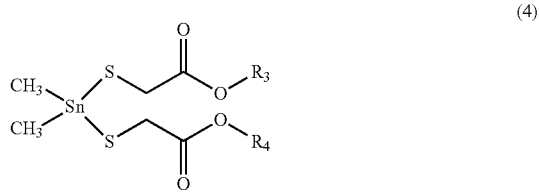

(4)

In Formula (4), $R_3$ and $R_4$ are each independently a hydrocarbon group. The hydrocarbon groups are the same as the hydrocarbon groups represented by $R_1$ and $R_2$.

Specific examples of the dimethyltin dithioglycolate include dimethyltin bis(2-ethylhexyl thioglycolate) represented by Formula (4-1) below.

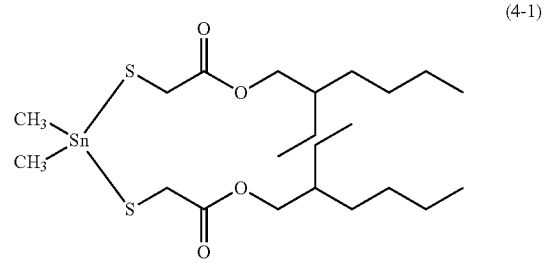 [SMILES: CCCCC(CC)COC(=O)C[S][Sn]([CH3])([CH3])[S]CC(=O)OCC(CC)CCCC]

(4-1)

The method of producing the dimethyl tin catalyst is not particularly limited. Examples thereof include conventionally known methods. One type of the dimethyl tin catalyst may be used alone, or a combination of two or more types of the dimethyl tin catalysts may be used.

From the perspective of achieving even better adhesion, curability, storage stability of the uncured product, and excellent stability in pipes, the content of the dimethyl tin catalyst is preferably from 0.0005 to 1.0 part by mass, more preferably from 0.005 to 0.5 parts by mass, and even more preferably from 0.01 to 0.3 parts by mass, per 100 parts by mass of the urethane prepolymer.

Tertiary Amine

The adhesive composition according to an embodiment of the present technology may further contain a tertiary amine.

Examples of the tertiary amine include open-chain amines, such as trimethylamine, triethylamine, tripropylamine, tributylamine, triamylamine, trihexylamine, trioctylamine, trilaurylamine, dimethylethylamine, dimethylpropylamine, dimethylbutylamine, dimethylamylamine, dimethylhexylamine, dimethylcyclohexylamine, dimethyloctylamine, dimethyllaurylamine, triallylamine, tetramethylethylenediamine, tetramethylbutanediamine, and triethanolamine;

amines in which a nitrogen atom constituting the tertiary amine forms a part of a ring structure, such as triethylenediamine, N-methylmorpholine, 4,4'-(oxydi-2,1-ethanediyl)bis-morpholine, N,N-dimethylaminoethylmorpholine, pyridine, picoline, 1,8-diazabicyclo[5.4.0]undecene-1,1,4-diazabicyclo[2.2.2]octane, N,N'-dimethylpiperazine, dimorpholinodiethyl ether, and bis(2,2-morpholinoethyl)ether;

amines having an ether bond, such as bis(dimethylaminoethyl)ether;

compounds having a ring structure and a tertiary amine, such as N,N-dimethylbenzylamine, dimethylaminomethylphenol, and trisdimethylaminomethylphenol.

One type of the tertiary amine may be used alone, or a combination of two or more types of the tertiary amines may be used.

Among these, N,N-dimethylaminoethylmorpholine or dimorpholinodiethylether is preferable from the perspective of achieving excellent coating formability during coating and achieving excellent balance between storage stability and curing rate.

An example of a preferable aspect is one in which the tertiary amine contains no aminosilane compound.

The content of the tertiary amine is preferably from 0.01 to 2.0 parts by mass per 100 parts by mass of the urethane prepolymer from the perspective of even better adhesion, storage stability of the adhesive agent, and excellent curability.

Other Components

The adhesive composition according to an embodiment of the present technology may contain, as necessary, additives in a range that does not inhibit the object of the present technology. Examples thereof include isocyanate compounds other than the aliphatic isocyanate A, silane coupling agents other than the aminosilane compound B, alcohols other than the monoterpene alcohols, catalysts other than the dimethyl tin catalysts and the tertiary amines, adhesion promoters, anti-sagging agents, anti-aging agents, antioxidants, pigments (dyes), thixotropic agents, ultraviolet absorbers, flame retardants, surfactants (including leveling agents), dispersing agents, dehydrating agents, and antistatic agents. The amount of the additive can be adjusted as desired.

Examples of the method of producing the adhesive composition according to an embodiment of the present technology include the "Method of producing adhesive composition" described below.

The adhesive composition according to an embodiment of the present technology is a one-part type.

The adhesive composition according to an embodiment of the present technology can be cured by moisture. For example, the composition can be cured by moisture in the air under conditions of −20 to +50° C.

The adhesive composition according to an embodiment of the present technology exhibits excellent adhesion to coated plates with poor adhesion even in low temperatures, such as environmental temperatures of −20° C. to +5° C.

The adherend to which the adhesive composition according to an embodiment of the present technology can be applied is not particularly limited. Examples thereof include metal (including coated plates), plastic, rubber, and glass.

The adhesive composition according to an embodiment of the present technology can be applied to the adherend without the use of a primer on the adherend.

The adhesive composition according to an embodiment of the present technology can be used on coated plates with poor adhesion. The coating material applied to the coated plate with poor adhesion is not particularly limited. Examples thereof include acryl/silane-based coating materials. Note that, in the present specification, "AB-based coating material" means "A-based coating material and B-based coating material". When the coating material applied to a coated plate with poor adhesion is an acryl/silane-based coating material, the coating material applied to the coated plate with poor adhesion is an acrylic coating material and a silane-based coating material.

Furthermore, the adhesive composition according to an embodiment of the present technology exhibits excellent adhesion to coated plates other than the coated plates with poor adhesion. The coated plates other than the coated plates with poor adhesion are not particularly limited. Examples thereof include conventionally known methods. Examples of the coating material used for the coated plates other than the coated plates with poor adhesion include urethane coating materials, acid/epoxy-based coating materials, and acryl/melamine-based coating materials.

Method of Producing Adhesive Composition

The method of producing the adhesive composition according to an embodiment of the present technology will be described below.

The method of producing the adhesive composition according to an embodiment of the present technology (the production method of the present technology) is a method of producing an adhesive composition, the method including:

a reaction step of obtaining the reaction product by reacting the aliphatic isocyanate A and the aminosilane compound B or the monoterpene alcohol;

a mixing step 1 of obtaining the preliminary composition by mixing the urethane prepolymer and the reaction product; and a mixing step 2 of producing the adhesive composition according to an embodiment of the present technology by mixing the preliminary composition and the dimethyl tin catalyst represented by Formula (1) above.

Reaction Step

In the reaction step, the aliphatic isocyanate A and the aminosilane compound B or the monoterpene alcohol are first reacted to obtain a reaction product.

The aliphatic isocyanate A, the aminosilane compound B, and the monoterpene alcohol used in the reaction step are, respectively, the same as the aliphatic isocyanate A, the aminosilane compound B, and the monoterpene alcohol used in the adhesive composition according to an embodiment of the present technology.

The reaction product can be obtained by heating and stirring the aliphatic isocyanate A and the aminosilane compound B or the monoterpene alcohol at, for example, 50 to 100° C.

Note that urethanization catalysts, such as organotin compounds, organic bismuth, and amine, can be further used as necessary.

The reaction product may contain an unreacted aliphatic isocyanate A, an aminosilane compound B, or a monoterpene alcohol.

Mixing Step 1

In the mixing step 1, a preliminary composition is then obtained by mixing a urethane prepolymer and the reaction product.

The urethane prepolymer and the reaction product that are used in the mixing step 1 are the same as those described above.

In the mixing step 1, at least one type selected from the group consisting of fillers and plasticizers can be further used.

When the at least one type selected from the group consisting of fillers and plasticizers is further used in the mixing step 1, the preliminary composition may be produced by first mixing the urethane prepolymer and the reaction product and then adding the at least one type selected from the group consisting of fillers and plasticizers.

Furthermore, the preliminary composition may be produced by simultaneously mixing the urethane prepolymer, the reaction product, and the at least one type selected from the group consisting of fillers and plasticizers.

In the mixing step 1, for example, a vertical mixer or a horizontal mixer can be used.

The mixing temperature in the mixing step 1 is preferably from 40 to 90° C.

The mixing step 1 is preferably performed under reduced pressure.

Mixing Step 2

Thereafter, in the mixing step 2, the adhesive composition according to an embodiment of the present technology is produced by mixing the preliminary composition and the dimethyl tin catalyst.

The dimethyl tin catalyst used in the mixing step 2 is the same as the dimethyl tin catalyst represented by Formula (1) above.

In the mixing step 2, for example, a vertical mixer or a horizontal mixer can be used.

The mixing temperature in the mixing step 2 is preferably from 40 to 70° C.

The mixing step 2 is preferably performed under reduced pressure.

When the adhesive composition according to an embodiment of the present technology further contains an additive, the additive can be appropriately added in the mixing step 1 and/or 2.

When the adhesive composition according to an embodiment of the present technology further contains a tertiary amine, an example of a preferable aspect is one in which the tertiary amine is used in the mixing step 2.

EXAMPLES

The present technology is described below in detail using examples but the present technology is not limited to such examples.

Preparation of Reaction Product (Reaction Step)

An isocyanate compound and a silane compound or a monoterpene alcohol shown in Table 1 were mixed in amounts (part by mass) shown in the same table. The obtained mixture was reacted in a condition at 50° C. for 10 hours to prepare a reaction product.

In Example 10, the molar ratio of the isocyanate group contained in the aliphatic isocyanate A1 to the hydroxy group contained in the monoterpene alcohol 1 (NCO group/OH group) was 3.0/0.93 (=3.2).

In Example 16, the molar ratio of the isocyanate group contained in the aliphatic isocyanate A2 to the hydroxy group contained in the monoterpene alcohol 1 (NCO group/OH group) was 3.0/1.1 (=2.7).

The prepared reaction product was used as is in the production of the composition.

Production of Composition

Mixing Step 1

In the mixing step 1, 200 parts by mass of the adhesive base material shown in the rows of "Mixing step 1" in Table 1 below and the reaction product prepared as described above were mixed using a horizontal mixer in a condition at 40 to 70° C. and 2 kPa or less for 1 hour to produce a preliminary composition. The preliminary composition produced as described above was used as is in the mixing step 2.

Mixing Step 2

Thereafter, in the mixing step 2, components shown in the rows of "Mixing step 2" in Table 1 below in compositions (part by mass) shown in the same table were added to the preliminary composition, and mixed using a horizontal mixer in a condition at 40 to 70° C. and 2 kPa or less to produce a composition.

Evaluation

The following evaluations were performed using the composition produced as described below. The results are shown in Table 1.

Flow Resistance

Each of the compositions produced as described above was extruded in a strip of right triangular beads with a base of 6 mm and a height of 10 mm onto a glass plate. The glass plate was held vertical (at an angle of 90°) such that the hypotenuse of the composition extruded in a shape of right triangle faced to the bottom and the side having the height of 10 mm of the composition was horizontal, and the glass plate was fixed. The glass plate was maintained in the vertical position and left in a condition at 20° C. and 65% relative humidity for 30 minutes.

The distance h (mm) of the sag of the vertex of the right triangle of the composition after the glass plate was left to stand in the vertical position for 30 minutes was measured, and the flow resistance was evaluated based on this value. The value is shown in the row of "Flow resistance" in Table 1. A smaller value indicates superior flow resistance.

Viscosity Increase Percentage

Initial Viscosity

Note that the SOD viscosity (initial viscosity) of the composition produced as described above was measured using a pressure viscometer (ASTM D 1092) in accordance with JASO (Japanese Automotive Standards Organization) M338-89.

Viscosity after Storage

The composition produced as described above was placed in a container, and the air inside the container was replaced with a nitrogen gas. The container was sealed, and the composition was stored for 7 days at 40° C. Thereafter, SOD viscosity (Pa·s) of the composition was measured. The measurement method of the viscosity after the storage was the same as the method described above.

Calculation of Viscosity Increase Percentage and Evaluation Criteria

The viscosity increase percentage (the ratio of increased viscosity to initial viscosity) was calculated from the initial viscosity and the viscosity after the storage.

The case where the viscosity increase percentage was 30% or less was evaluated as achieving excellent viscosity stability (storage stability).

Heat-Resistant Adhesion

Production of Sample for Heat-Resistant Adhesion Evaluation

One sheet of glass (25 mm length×100 mm width×8 mm thickness; primer-treated; the primer was MS-90 (trade name), available from the Yokohama Rubber Co., Ltd.) was prepared as an adherend.

The composition produced as described above was applied to the glass at room temperature.

After the coating, compression bonding was performed until the thickness of the composition on the glass became 5 mm, and the composition was cured in a condition at 23° C. and a relative humidity of 50% for 72 hours and then left in an environment at 120° C. for 7 days. This was used as a sample for heat-resistant adhesion evaluation.

Hand Peel Test

Hand peel test was performed using the sample for heat-resistant adhesion evaluation obtained as described above with a utility knife.

As a result of the hand peel test, the case where the composition after the curing resulted in cohesive failure was indicated as "CF". In this case, significantly excellent heat-resistant adhesion was exhibited.

Furthermore, the case where the composition after the curing resulted in interfacial failure in the interface between the composition and the primer was indicated as "PS". In this case, heat-resistant adhesion was low.

Stability in Pipes

The composition produced as described above was filled in a hose (diameter: 5 mm; length: 20 cm; trade name: CHUKOH FLO tube, available from Chukoh Chemical Industries, Ltd.; formed of polytetrafluoroethylene (PTFE)) with care such that air is not filled therein. After the filling, the hose was closely sealed and the sealed hose was left in a condition at 50° C. for 1 week.

After 1 week, the hose was returned to a room temperature, the center of the hose was cut into a round slice and the inside of the hose was observed by removing the uncured composition from the hose.

The case where no composition was left in the hose was evaluated as achieving excellent stability in pipes and indicated as "Excellent".

In the case where the composition was cured from the inner surface to the center of the hose, the thickness of the cured composition was measured from a given point on the inner surface of the hose in a direction toward the center of the cross section of the hose in the cross section of the hose. A greater thickness indicates lower stability in pipes.

Adhesion 1

Production of Sample for Evaluating Adhesion 1

A coated plate with poor adhesion obtained by applying an acryl/silane-based coating material to a steel plate was prepared.

Each of the compositions produced as described above was directly applied to the coated plate with poor adhesion without the use of a primer, cured in a condition at 5° C. and a relative humidity of 50% for 7 days to cure the composition, thereby producing a sample. The thickness of the composition after the curing was 5 mm. The sample produced as described above was used as the sample for evaluating the adhesion 1.

Peel Test

One end of the composition after the curing of the sample produced as described above was held, and peel test was performed by subjecting the composition after the curing to 180° peeling from the coated plate with poor adhesion in a condition at 20° C. The failure state was then observed.

The case where the cohesive failure occurred in the cured product was evaluated as achieving excellent adhesion and indicated as "CF".

The case where the interfacial failure occurred in the cured product was evaluated as exhibiting low adhesion and indicated as "AF".

Adhesion 2

Production of Sample for Evaluating Adhesion 2

A coated plate with poor adhesion obtained by applying an acryl/silane-based coating material to a steel plate was prepared.

Furthermore, each of the compositions produced as described above was stored in a condition at 50° C. and a relative humidity of 95% for 14 days to prepare a composition after the storage.

The composition after the storage prepared as described above was directly applied to the coated plate with poor adhesion without the use of a primer, cured in a condition at 5° C. and a relative humidity of 50% for 7 days to cure the composition, thereby producing a sample. The thickness of the composition after the curing was 5 mm. The sample produced as described above was used as the sample for evaluating the adhesion 2.

The peel test was performed in the same manner as the peel test for adhesion 1 except for using the sample for evaluating the adhesion 2. The evaluation criteria were also the same as those of the evaluation of the adhesion 1.

TABLE 1

|  |  |  |  | Comparative Examples | | |
|---|---|---|---|---|---|---|
|  |  |  |  | 1 | 2 | 3 |
| Mixing step 1 | | | | | | |
|  | Adhesive base material | | | 200 | 200 | 200 |
|  | Isocyanate compound | Aliphatic isocyanate A1 | D165N | | | |
|  |  | Aliphatic isocyanate A2 | D170N | | 6 | 6 |
|  |  | (Comparison) aromatic isocyanate | DM1351 | 6 | | |
|  | Silane compound | (Comparison) mercaptosilane | KBM802 | | 2 | |
|  |  | Aminosilane compound B1 | KBM573 | 2 | | 2 |
|  | Monoterpene alcohol | Monoterpene alcohol 1 | | | | |
| Mixing step 2 | | | | | | |
|  | Metal catalyst | (Comparison) bismuth catalyst | U600 | | | 0.01 |
|  |  | (Comparison) dioctyl tin catalyst | U810 | | | |
|  |  | (Comparison) dibutyl tin catalyst | U100 | | | |
|  |  | Dimethyl tin catalyst 1 (carboxylate) | UL-22 | | | |
|  |  | Dimethyl tin catalyst 2 (mercaptide) | UL-28 | | | |
|  |  | Dimethyl tin catalyst 3 (thioglycolate) | UL-54 | 0.01 | 0.01 | |
|  | Amine catalyst | Amine catalyst 1 | TEDA | | | |
|  |  | Amine catalyst 2 | DMDEE | 0.3 | 0.3 | 0.3 |
| Flow resistance | | | | 0 | 2 | 0 |
| Viscosity increase percentage (%) | | | | 15 | 28 | 15 |
| Heat-resistant adhesion | | | | CF | CF | CF |
| Stability in pipes | | | | Excellent | Excellent | Excellent |
| Adhesion 1 | | | | AF | AF | AF |
| Adhesion 2 | | | | AF | AF | AF |

TABLE 1-continued

|  |  |  | Comparative Examples | |
|---|---|---|---|---|
|  |  |  | 4 | 5 |
| Mixing step 1 | | | | |
| Adhesive base material | | | 200 | 200 |
| Isocyanate compound | Aliphatic isocyanate A1 | D165N | 6 | 6 |
| | Aliphatic isocyanate A2 | D170N | | |
| | (Comparison) aromatic isocyanate | DM1351 | | |
| Silane compound | (Comparison) mercaptosilane | KBM802 | | |
| | Aminosilane compound B1 | KBM573 | 2 | 2 |
| Monoterpene alcohol | Monoterpene alcohol 1 | | | |
| Mixing step 2 | | | | |
| Metal catalyst | (Comparison) bismuth catalyst | U600 | | |
| | (Comparison) dioctyl tin catalyst | U810 | 0.01 | |
| | (Comparison) dibutyl tin catalyst | U100 | | 0.01 |
| | Dimethyl tin catalyst 1 (carboxylate) | UL-22 | | |
| | Dimethyl tin catalyst 2 (mercaptide) | UL-28 | | |
| | Dimethyl tin catalyst 3 (thioglycolate) | UL-54 | | |
| Amine catalyst | Amine catalyst 1 | TEDA | | |
| | Amine catalyst 2 | DMDEE | 0.3 | 0.3 |
| Flow resistance | | | 0 | 0 |
| Viscosity increase percentage (%) | | | 15 | 15 |
| Heat-resistant adhesion | | | CF | CF |
| Stability in pipes | | | Excellent | Excellent |
| Adhesion 1 | | | AF | AF |
| Adhesion 2 | | | AF | AF |

|  |  |  | Examples | | | |
|---|---|---|---|---|---|---|
|  |  |  | 1 | 2 | 3 | 4 |
| Mixing step 1 | | | | | | |
| Adhesive base material | | | 200 | 200 | 200 | 200 |
| Isocyanate compound | Aliphatic isocyanate A1 | D165N | 6 | 6 | 6 | 6 |
| | Aliphatic isocyanate A2 | D170N | | | | |
| | (Comparison) Aromatic isocyanate | DM1351 | | | | |
| Silane compound | (Comparison) Mercaptosilane | KBM802 | | | | |
| | Aminosilane compound B1 | KBM573 | 2 | 2 | 2 | 2 |
| Monoterpene alcohol | Monoterpene alcohol 1 | | | | | |
| Mixing step 2 | | | | | | |
| Metal catalyst | (Comparison) Bismuth catalyst | U600 | | | | |
| | (Comparison) Dioctyl tin catalyst | U810 | | | | |
| | (Comparison) Dibutyl tin catalyst | U100 | | | | |
| | Dimethyl tin catalyst 1 (carboxylate) | UL-22 | 0.001 | | | 0.01 |
| | Dimethyl tin catalyst 2 (mercaptide) | UL-28 | | 0.001 | | |
| | Dimethyl tin catalyst 3 (thioglycolate) | UL-54 | | | 0.001 | |
| Amine catalyst | Amine catalyst 1 | TEDA | | | | |
| | Amine catalyst 2 | DMDEE | 0.3 | 0.3 | 0.3 | 0.3 |
| Flow resistance | | | 0 | 0 | 0 | 0 |
| Viscosity increase percentage (%) | | | 12 | 14 | 10 | 15 |
| Heat-resistant adhesion | | | CF | CF | CF | CF |
| Stability in pipes | | | Excellent | Excellent | Excellent | Excellent |
| Adhesion 1 | | | CF | CF | CF | CF |
| Adhesion 2 | | | CF | CF | CF | CF |

TABLE 1-continued

|  |  |  |  | Examples | | |
|---|---|---|---|---|---|---|
|  |  |  |  | 5 | 6 | 7 |
| Mixing step 1 | | | | | | |
|  | Adhesive base material | | | 200 | 200 | 200 |
|  | Isocyanate compound | Aliphatic isocyanate A1 | D165N | 6 | 6 | 6 |
|  |  | Aliphatic isocyanate A2 | D170N | | | |
|  |  | (Comparison) Aromatic isocyanate | DM1351 | | | |
|  | Silane compound | (Comparison) Mercaptosilane | KBM802 | | | |
|  |  | Aminosilane compound B1 | KBM573 | 2 | 2 | 2 |
|  | Monoterpene alcohol | Monoterpene alcohol 1 | | | | |
| Mixing step 2 | | | | | | |
|  | Metal catalyst | (Comparison) Bismuth catalyst | U600 | | | |
|  |  | (Comparison) Dioctyl tin catalyst | U810 | | | |
|  |  | (Comparison) Dibutyl tin catalyst | U100 | | | |
|  |  | Dimethyl tin catalyst 1 (carboxylate) | UL-22 | | | 0.3 |
|  |  | Dimethyl tin catalyst 2 (mercaptide) | UL-28 | 0.01 | | |
|  |  | Dimethyl tin catalyst 3 (thioglycolate) | UL-54 | | 0.01 | |
|  | Amine catalyst | Amine catalyst 1 | TEDA | | | |
|  |  | Amine catalyst 2 | DMDEE | 0.3 | 0.3 | 0.3 |
| Flow resistance | | | | 0 | 0 | 0 |
| Viscosity increase percentage (%) | | | | 17 | 12 | 24 |
| Heat-resistant adhesion | | | | CF | CF | CF |
| Stability in pipes | | | | Excellent | Excellent | Excellent |
| Adhesion 1 | | | | CF | CF | CF |
| Adhesion 2 | | | | CF | CF | CF |

|  |  |  |  | Examples | | |
|---|---|---|---|---|---|---|
|  |  |  |  | 8 | 9 | 10 |
| Mixing step 1 | | | | | | |
|  | Adhesive base material | | | 200 | 200 | 200 |
|  | Isocyanate compound | Aliphatic isocyanate A1 | D165N | 6 | 6 | 6 |
|  |  | Aliphatic isocyanate A2 | D170N | | | |
|  |  | (Comparison) Aromatic isocyanate | DM1351 | | | |
|  | Silane compound | (Comparison) Mercaptosilane | KBM802 | | | |
|  |  | Aminosilane compound B1 | KBM573 | 2 | 2 | |
|  | Monoterpene alcohol | Monoterpene alcohol 1 | | | | 1.8 |
| Mixing step 2 | | | | | | |
|  | Metal catalyst | (Comparison) Bismuth catalyst | U600 | | | |
|  |  | (Comparison) Dioctyl tin catalyst | U810 | | | |
|  |  | (Comparison) Dibutyl tin catalyst | U100 | | | |
|  |  | Dimethyl tin catalyst 1 (carboxylate) | UL-22 | | | |
|  |  | Dimethyl tin catalyst 2 (mercaptide) | UL-28 | 0.3 | | 0.01 |
|  |  | Dimethyl tin catalyst 3 (thioglycolate) | UL-54 | | 0.3 | |
|  | Amine catalyst | Amine catalyst 1 | TEDA | | | |
|  |  | Amine catalyst 2 | DMDEE | 0.3 | 0.3 | 0.3 |
| Flow resistance | | | | 0 | 0 | 0 |
| Viscosity increase percentage (%) | | | | 25 | 22 | 11 |
| Heat-resistant adhesion | | | | CF | CF | CF |
| Stability in pipes | | | | Excellent | Excellent | Excellent |
| Adhesion 1 | | | | CF | CF | CF |
| Adhesion 2 | | | | CF | CF | CF |

TABLE 1-continued

|  |  |  | Examples | | |
|---|---|---|---|---|---|
|  |  |  | 11 | 12 | 13 |
| Mixing step 1 | | | | | |
|  | Adhesive base material | | 200 | 200 | 200 |
|  | Isocyanate compound | Aliphatic isocyanate A1 | D165N | | |
|  |  | Aliphatic isocyanate A2 | D170N | 6 | 6 | 6 |
|  |  | (Comparison) Aromatic isocyanate | DM1351 | | | |
|  | Silane compound | (Comparison) Mercaptosilane | KBM802 | | | |
|  |  | Aminosilane compound B1 | KBM573 | 2 | 2 | 2 |
|  | Monoterpene alcohol | Monoterpene alcohol 1 | | | | |
| Mixing step 2 | | | | | |
|  | Metal catalyst | (Comparison) Bismuth catalyst | U600 | | | |
|  |  | (Comparison) Dioctyl tin catalyst | U810 | | | |
|  |  | (Comparison) Dibutyl tin catalyst | U100 | | | |
|  |  | Dimethyl tin catalyst 1 (carboxylate) | UL-22 | | 0.5 | |
|  |  | Dimethyl tin catalyst 2 (mercaptide) | UL-28 | 0.01 | | 0.5 |
|  |  | Dimethyl tin catalyst 3 (thioglycolate) | UL-54 | | | |
|  | Amine catalyst | Amine catalyst 1 | TEDA | | | |
|  |  | Amine catalyst 2 | DMDEE | 0.3 | 0.3 | 0.3 |
| Flow resistance | | | | 0 | 0 | 0 |
| Viscosity increase percentage(%) | | | | 15 | 32 | 35 |
| Heat-resistant adhesion | | | | CF | PS | PS |
| Stability in pipes | | | | Excellent | 2.5 mm | 1.8 mm |
| Adhesion 1 | | | | CF | CF | CF |
| Adhesion 2 | | | | CF | CF | CF |

|  |  |  | Examples | | |
|---|---|---|---|---|---|
|  |  |  | 14 | 15 | 16 |
| Mixing step 1 | | | | | |
|  | Adhesive base material | 200 | 200 | 200 | 200 | 200 |
|  | Isocyanate compound | Aliphatic isocyanate A1 | D165N | | | |
|  |  | Aliphatic isocyanate A2 | D170N | 6 | 6 | 6 |
|  |  | (Comparison) Aromatic isocyanate | DM1351 | | | |
|  | Silane compound | (Comparison) Mercaptosilane | KBM802 | | | |
|  |  | Aminosilane compound B1 | KBM573 | 2 | 2 | |
|  | Monoterpene alcohol | Monoterpene alcohol 1 | | | | 1.8 |
| Mixing step 2 | | | | | |
|  | Metal catalyst | (Comparison) Bismuth catalyst | U600 | | | |
|  |  | (Comparison) Dioctyl tin catalyst | U810 | | | |
|  |  | (Comparison) Dibutyl tin catalyst | U100 | | | |
|  |  | Dimethyl tin catalyst 1 (carboxylate) | UL-22 | | | |
|  |  | Dimethyl tin catalyst 2 (mercaptide) | UL-28 | | | 0.01 |
|  |  | Dimethyl tin catalyst 3 (thioglycolate) | UL-54 | 0.5 | 0.01 | |
|  | Amine catalyst | Amine catalyst 1 | TEDA | | 0.3 | |
|  |  | Amine catalyst 2 | DMDEE | 0.3 | | 0.3 |
| Flow resistance | | | | 0 | 3 | 0 |
| Viscosity increase percentage(%) | | | | 28 | 15 | 12 |

TABLE 1-continued

| | | | |
|---|---|---|---|
| Heat-resistant adhesion | PS | PS | CF |
| Stability in pipes | Excellent | 1.5 mm | Excellent |
| Adhesion 1 | CF | CF | CF |
| Adhesion 2 | CF | CF | CF |

Details of the components listed in Table 1 are as follows.
Adhesive base material: substance described below
Aliphatic isocyanate A1: biuret of hexamethylene diisocyanate (HDI) represented by Formula (7) above (D165N, available from Mitsui Chemicals, Inc.)
Aliphatic isocyanate A2: isocyanurate of HDI represented by Formula (8) above, Takenate D170N, available from Mitsui Chemicals, Inc.
Aromatic isocyanate: isocyanurate of tolylene diisocyanate (TDI), Desmodur 1351, available from Bayer
Mercaptosilane: 3-mercaptopropyl methyldimethoxysilane, KBM-802, available from Shin-Etsu Chemical Co., Ltd.
Aminosilane compound B1: N-phenyl-3-aminopropyltriethoxysilane, KBM-573, available from Shin-Etsu Chemical Co., Ltd.
Monoterpene alcohol 1: terpineol; trade name: Terpineol C, available from Nippon Terpene Chemicals, Inc.
Bismuth catalyst: inorganic bismuth (NEOSTANN U-600, available from Nitto Kasei Co., Ltd.)
Dioctyl tin catalyst: dioctyltin dilaurate (NEOSTANN U-810, available from Nitto Kasei Co., Ltd.)
Dibutyl tin catalyst: dibutyltin dilaurate (NEOSTANN U-100, available from Nitto Kasei Co., Ltd.)
Dimethyl tin catalyst 1: dimethyltin dilaurate (trade name: UL-22, available from Momentive Performance Materials Inc.)
Dimethyl tin catalyst 2: dimethyltin didodecacyl mercaptide (trade name: UL-28, available from Momentive Performance Materials Inc.)
Dimethyl tin catalyst 3: dimethyltin bis(2-ethylhexylthioglycolate) (trade name: UL-54, available from Momentive Performance Materials Inc.)
Amine catalyst 1 (TEDA): triethylenediamine (DABCO, available from Air Products and Chemicals, Inc.)
Amine catalyst 2 (DMDEE): dimorpholinodiethyl ether (available from San-Apro Ltd.)
For the adhesive base material shown in Table 1, the components shown in Table 2 below were used in the composition (part by mass) shown in the same table.

TABLE 2

| | |
|---|---|
| Urethane prepolymer | 100 |
| Carbon black | 50 |
| Calcium carbonate | 30 |
| Plasticizer | 20 |

Details of the components listed in Table 2 are as follows.
Urethane prepolymer: The urethane prepolymer containing 1.45% of isocyanate groups was synthesized by mixing 500 g (weight average molecular weight: 2000) of polyoxypropylene diol, 1150 g (weight average molecular weight: 5000) of polyoxypropylene triol, and 264 g of 4,4'-diisocyanate phenylmethane (molecular weight: 250) (at this time NCO/OH=1.8), stirring the mixture in a nitrogen gas stream at 80° C. for 24 hours to allow the mixture to react.
Carbon black: N220, available from NSCC Carbon Co., Ltd.
Calcium carbonate: heavy calcium carbonate (Super S, available from Maruo Calcium Co., Ltd.)
Plasticizer: diisononyl phthalate (DINP, available from Jay Plus, Inc.)

As is clear from the results shown in Table 1, the adhesive composition of Comparative Example 1 which contained the reaction product of the aromatic isocyanate and the aminosilane compound exhibited low adhesion to the coated plate with poor adhesion.

The adhesive composition of Comparative Example 2 which contained the reaction product of the aliphatic isocyanate and the mercaptosilane exhibited low adhesion to the coated plate with poor adhesion.

The adhesive composition of Comparative Examples 3 to 5, which contained metal catalysts other than the dimethyl tin catalyst, exhibited low adhesion to the coated plates with poor adhesion.

On the other hand, it was found that the adhesive composition according to an embodiment of the present technology achieved the predetermined effects.

When the viscosity increase percentages of Examples 1 to 3 are compared for the structures of the dimethyl tin catalysts, it was found that the lowest viscosity increase percentage was achieved in the case where the dimethyl tin catalyst had a thioglycolate structure. The same results were shown in the comparison of Examples 4 to 6, comparison of Examples 7 to 9, and comparison of Examples of 12 to 14.

Furthermore, when the stabilities in pipes of Examples 12 to 14 are compared for the structures of the dimethyl tin catalysts, superior stability in pipes was achieved in the order of dimethyltin dicarboxylate, dimethyltin dimercaptide, and dimethyltin dithioglycolate and the best stability in pipes was achieved by dimethyltin dithioglycolate.

When Examples 11 and 13 are compared for the contents of the dimethyl tin catalysts, it was found that the case where the content of the dimethyl tin catalyst was less than 0.5 parts by mass per 100 parts by mass of the urethane prepolymer achieved excellent heat-resistant adhesion and stability in pipes.

When Examples 1, 4, and 7 are compared for the contents of the dimethyl tin catalysts, it was found that lower viscosity increase percentage was achieved in the case where the content of the dimethyl tin catalyst was lower. The same results were shown in the comparison of Examples 2, 5, and 8, comparison of Examples 3, 6, and 9, and comparison of Examples of 11 and 13.

The invention claimed is:

1. A one-part moisture curable adhesive composition comprising:
a preliminary composition containing a urethane prepolymer and a reaction product of an aliphatic isocyanate A and an aminosilane compound B or a monoterpene alcohol; and
a dimethyl tin catalyst represented by Formula (1):

$$CH_3 \diagdown_{Sn} \diagup^{X_1-R_1}_{X_2-R_2} \quad CH_3 \diagup \qquad \diagdown \qquad (1)$$

wherein $X_1$ and $X_2$ are each a sulfur atom, and $R_1$ and $R_2$ are each an ester bond-containing alkyl group.

2. The adhesive composition according to claim 1, wherein a content of the dimethyl tin catalyst is from 0.001 to 0.3 parts by mass per 100 parts by mass of the urethane prepolymer.

3. The adhesive composition according to claim 1, wherein the aliphatic isocyanate A is at least one hexamethylene diisocyanate modified product selected from the group consisting of reaction products of hexamethylene diisocyanate and a polyol having tri- or higher functionality, allophanates of hexamethylene diisocyanate, isocyanurates of hexamethylene diisocyanate, and biurets of hexamethylene diisocyanate.

4. The adhesive composition according to claim 1, wherein the aminosilane compound B has an imino group, and the imino group bonds to at least one aromatic hydrocarbon group.

5. The adhesive composition according to claim 1, further comprising a tertiary amine.

6. The adhesive composition according to claim 1, wherein the preliminary composition further contains a filler.

7. The adhesive composition according to claim 1, wherein the preliminary composition further contains a plasticizer.

8. A method of producing an adhesive composition, the method comprising:
   a reaction step of obtaining the reaction product by reacting the aliphatic isocyanate A and the aminosilane compound B or the monoterpene alcohol;
   a mixing step 1 of obtaining the preliminary composition by mixing the urethane prepolymer and the reaction product; and
   a mixing step 2 of producing the adhesive composition described in claim 1 by mixing the preliminary composition and the dimethyl tin catalyst.

9. The method of producing the adhesive composition according to claim 8, wherein in the mixing step 1, at least one selected from the group consisting of fillers and plasticizers is further mixed.

10. The method of producing the adhesive composition according to claim 8, wherein in the mixing step 2, a tertiary amine is further mixed.

* * * * *